US006534582B1

(12) United States Patent
Decaumont et al.

(10) Patent No.: US 6,534,582 B1
(45) Date of Patent: Mar. 18, 2003

(54) ADAPTIVE MATERIAL OF TERNARY COMPOSITION

(75) Inventors: Anne Decaumont, Bretigny sur Orge (FR); Stanislas Galaj, Arcueil (FR); Nadine Rieux, Antony (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/414,816

(22) Filed: Oct. 8, 1999

(30) Foreign Application Priority Data

Oct. 12, 1998 (FR) .......................................... 98 12 734

(51) Int. Cl.$^7$ .............................. C08J 5/10; C08K 3/18; C08K 3/22
(52) U.S. Cl. ........................................................ 524/432
(58) Field of Search .................................. 524/432, 555

(56) References Cited

U.S. PATENT DOCUMENTS

| 3,711,428 A | * | 1/1973 | Aycock et al. ............... 252/502 |
| 4,470,898 A | * | 9/1984 | Penneck et al. ............. 252/511 |
| 5,714,534 A | * | 2/1998 | Kojima et al. ............... 524/156 |
| 5,770,216 A |   | 6/1998 | Mitchnick et al. |
| 5,965,206 A | * | 10/1999 | Hilti et al. ................ 427/393.1 |

FOREIGN PATENT DOCUMENTS

| FR | 2 547 451 A1 | 12/1984 |
| WO | WO 97/26693 | 7/1997 |

OTHER PUBLICATIONS

Patent Abstracts of Japan, vol. 018, No. 414 (E–1587), Aug. 3, 1994 corresponding to JP 06124805 A (Totoku Electric Co. Ltd.) May 6, 1994.
Patent Abstracts of Japan, vol. 098, No. 013, Nov. 30, 1998 corresponding to JP 10 214705 A (TDK Corp) dated Aug. 11, 1998.

* cited by examiner

Primary Examiner—James J. Seidleck
Assistant Examiner—U.K Rajguru
(74) Attorney, Agent, or Firm—Sughrue Mion, PLLC

(57) ABSTRACT

The invention relates to an adaptive material having ternary compositions. They can advantageously be used in electric cables and in terminations thereof where it serves to improve charge flow characteristics and reactions to transient electric fields. This composite material having non-linear electrical resistance comprises a polymer matrix and varistor means comprising zinc oxide, and it further includes a wetting agent.

8 Claims, 1 Drawing Sheet

ADAPTIVE MATERIAL OF TERNARY COMPOSITION

The invention relates to an adaptive material of ternary composition. It can be used advantageously in electric cables and their terminations where it serves to improve charge flow characteristics and reactions to transient electric fields.

BACKGROUND OF THE INVENTION

The solution known in the prior art, e.g. as used in patent application WO 97/26693, is to introduce particles having non-linear electrical behavior, e.g. particles of doped zinc oxide, into the insulating material so as to improve electric field distribution therein. Nevertheless, that solution has the defect of possessing electrical characteristics that are difficult to reproduce. It is thus not possible to obtain behavior that is constant within composites made of such a matrix and such particles. For example, the elastic behavior of certain matrices can give rise to cavities around the particles, so electric characteristics are then no longer homogenous, which can give rise to undesirable local phenomena. In order to solve those problems, the recommended solutions consist of modifying the proportions and the quantities of particles so as to optimize the electric characteristics of such materials. Nevertheless, the desired level of reproducibility has not been achieved.

OBJECTS AND SUMMARY OF THE INVENTION

The invention enables those problems to be remedied by adding a new component to the known mixture, which component is to be found in the vicinity of the particles and is capable of making the electric field locally uniform within the composite.

The invention has three components.

The first component is a matrix of the kind commonly used in applications such as cable joints and terminations.

The second component is a collection of particles having non-linear electrical behavior. These particles are dispersed in uniform manner within the matrix. On coming into contact with an electric field, this component behaves in intrinsically non-linear manner and can reduce the electrical stress within the insulating matrix. It also possesses the property of being insulating in the absence of electric voltage. Doped zinc oxide can be used for this component.

The last component serves to provide bonding between the first two components. It is selected from surface-active agents. Its function is to fill as well as possible the interface between the matrix and the particles and to make the local electric field uniform. By way of example, this component can be polyethylene oxide (PEO) or polypropylene oxide (PPO). These elements can advantageously be used in a form that has been doped with a monovalent $Li^+$ ion. Electrically-conductive polymers such as polyaniline or polypyrrol can also be envisaged. These examples are not limiting and the person skilled in the art can easily use other compounds that possess the same properties.

In the manufacturing process, the three ingredients are blended together while in powder form. It is possible to add a doping agent such as organic salts of lithium. It is conventional to use active agents to disperse the powder over the matrix. In the context of the invention, it is advantageous to use specific substances that also have conductivity properties, thereby avoiding an electric gradient that is too great at the interface between the matrix and the particles. Such substances are both surface-active agents and conductors. Conductive polymers can possess certain groups which have affinities with the matrix and with oxides of zinc. For example, with sulfonated polyaniline, it is possible to transform it into a suitable interface by adjusting the molecular mass and the viscosity of these substances. It is necessary to avoid the wetting agent being too liquid. If it is too liquid, then good dispersion will not take place and performance will again be random, thus preventing reproducibility. It is thus necessary for it to have viscosity close to that of the matrix. If viscosity is measured on a logarithmic scale, the viscosity of the wetting agent should be about one decade smaller than that of the matrix.

The invention makes it possible to improve the performance of the materials, and in particular the reproducibility of their electrical characteristics, and finally, it makes it possible to increase the number of matrices used and to obtain only a small amount of dispersion in the threshold stress. The concentration and the size of filler varies as a function of the application, thus making it possible to adjust the threshold stress. Advantageously, it is thus possible to use this material in applications where energy is small. In addition, the reduced amount of dispersion makes it possible to reduce the number of particles that are required.

MORE DETAILED DESCRIPTION

Figure 1:
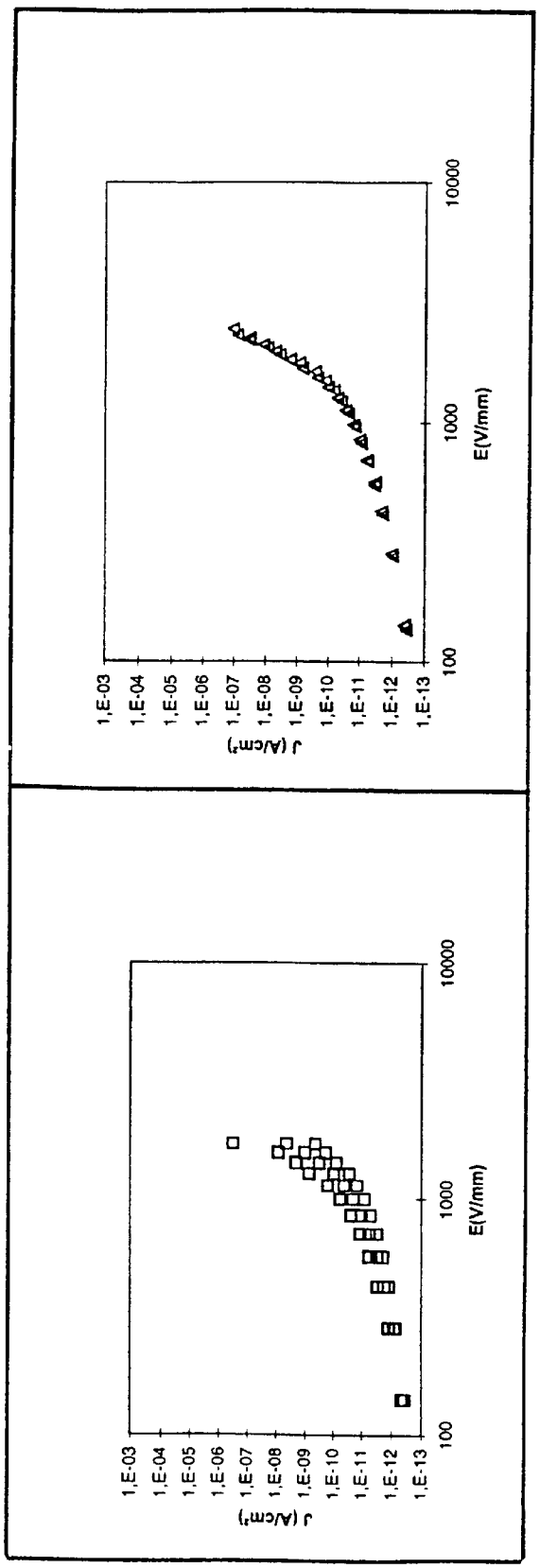
FIG. 1 shows the good reproducibility of the electrical characteristics (voltage and current) of the composite.

In preferred but non-essential manner, the surface-active agent appropriate for the composite is polyethylene oxide (PEO). It is made up of repeated —($CH_2$—$CH_2$—O)— units. Its density is 1.2 grams per cubic centimeter ($g/cm^3$). For a molecular mass of 100,000, its melting temperature is 75° C. The PEO is in the liquid state while the mixture is being made.

PEO inserts itself naturally at the interface between the matrix and its filler since it has special affinity for both of those elements. Firstly the $CH_2$—$CH_2$ portion bonds to the carbon chains of the polymer by means of Van der Waals type bonds, and its oxygen portion creates dipolar bonds with cations of zinc or additives ($Co_2^+$, $CO_3^+$, $Mn_3^+$, ... ) at the surface of the zinc oxide.

It is possible to make four mixtures using different quantities of PEO: 0, 1, 2, and 10. One dose of PEO corresponds to the equivalent of a 5 nanometer layer around a grain of zinc oxide. The filler density is 31% and grain size is 100 $\mu$m to 250 $\mu$m.

What is claimed is:

1. A composite material having non-linear electrical resistance, the material comprising a polymer matrix and varistor means comprising zinc oxide, the material further including a wetting agent, wherein the wetting agent is doped in part by lithium.

2. A composite material having non-linear electrical resistance, the material comprising a polymer matrix and varistor means comprising zinc oxide, the material further including a wetting agent, wherein the wetting agent is lithium-doped polypropylene oxide.

3. A composite material having non-linear electrical resistance, the material comprising a polymer matrix and a varistor comprising zinc oxide, the material further including a wetting agent, wherein the wetting agent is polypropylene oxide.

4. A composite material having non-linear electrical resistance, the material comprising a polymer matrix and a varistor comprising zinc oxide, the material further including a wetting agent, wherein the wetting agent is selected from the group consisting of polyaniline and polypyrrol.

5. A method of manufacturing a composite material having non-linear electrical resistance, the material comprising a polymer matrix and varistor means comprising zinc oxide, the material further including a wetting agent which is a lithium-doped polypropylene oxide, which method comprises:

blending together in a powder form at least a polymer matrix, zinc oxide and a wetting agent.

6. A composite material having non-linear electrical resistance, the material comprising a polymer matrix and a varistor comprising zinc oxide, the material further including a wetting agent, wherein the wetting agent has a viscosity measurement on a logarithmic scale that is about one decade smaller than a viscosity measurement of the matrix.

7. The manufacturing method of claim 5, which further comprises selecting the polymer matrix and wetting agent so that a relative viscosity on a logarithmic scale is that the wetting agent has viscosity about one decade smaller than that of the matrix.

8. A composite material having non-linear electrical resistance, the material comprising a polymer matrix and a varistor comprising zinc oxide, the material further including a wetting agent, wherein the wetting agent is lithium-doped polyethylene oxide.

* * * * *